Jan. 26, 1926.

M. MULLER 1,570,765

CALCULATING MACHINE PROVIDED WITH TWO COUNTERS

Filed May 22, 1925    3 Sheets-Sheet 1

Inventor:
Max Muller
By B. Singer, Atty.

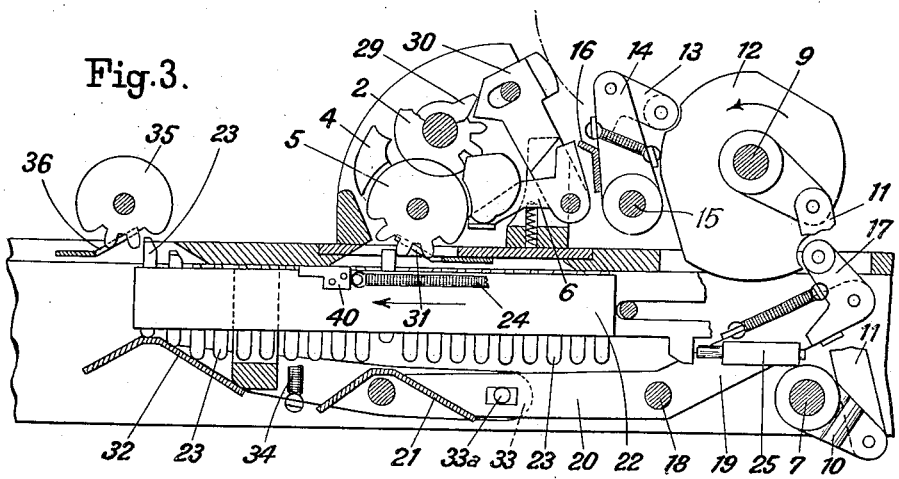
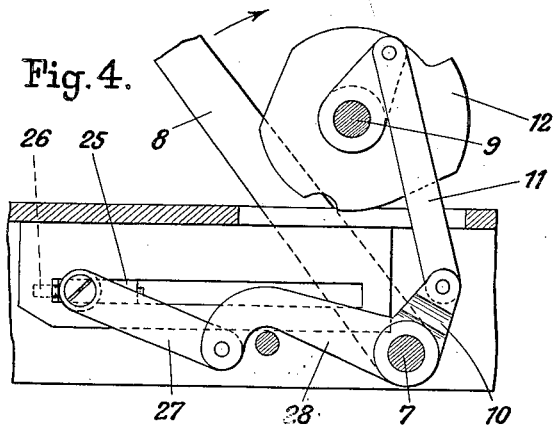
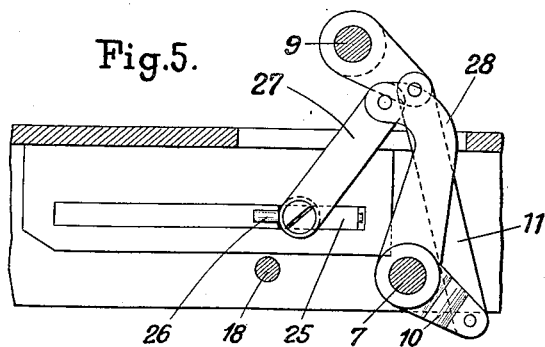

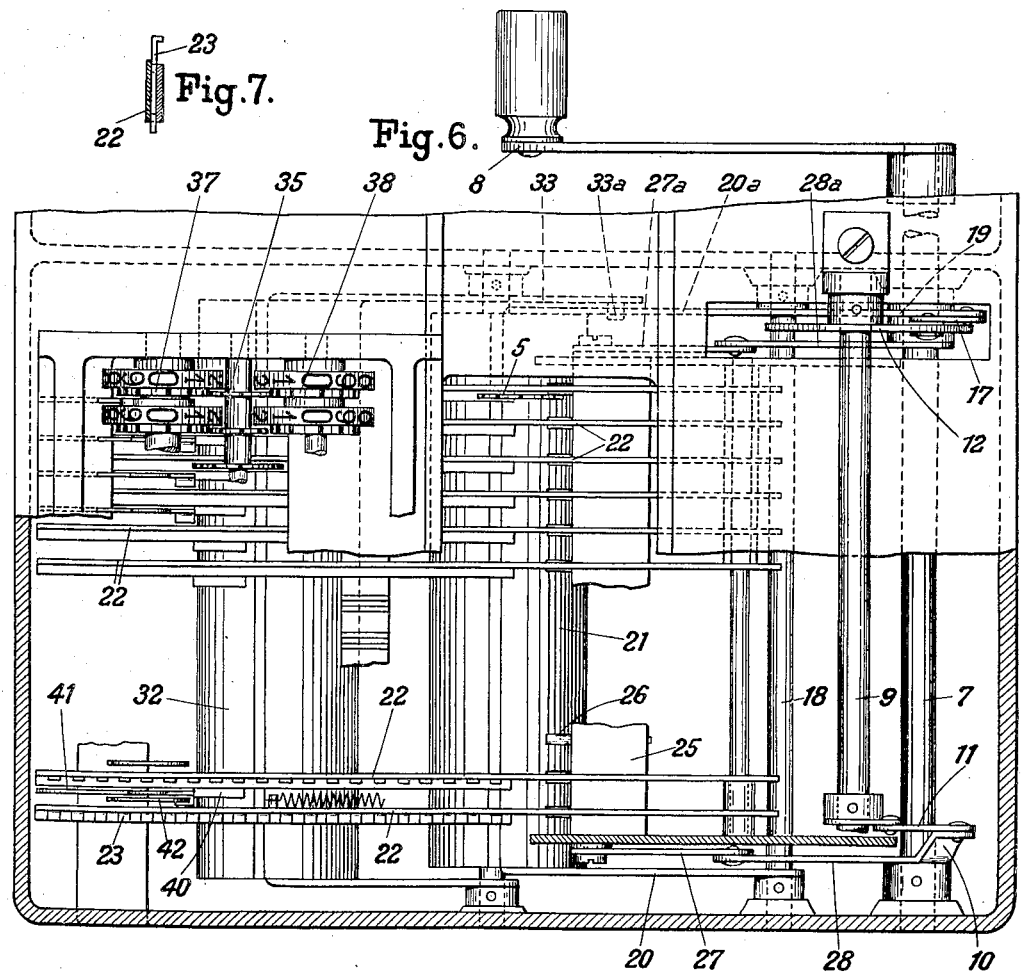

Patented Jan. 26, 1926.

1,570,765

UNITED STATES PATENT OFFICE.

MAX MÜLLER, OF RASTATT, GERMANY, ASSIGNOR TO THALESWERK M. B. H., OF RASTATT, BADEN, GERMANY, A GERMAN COMPANY.

CALCULATING MACHINE PROVIDED WITH TWO COUNTERS.

Application filed May 22, 1925. Serial No. 32,157.

*To all whom it may concern:*

Be it known that I, MAX MÜLLER, a citizen of the German Empire, of Rastatt, Baden, Germany, have invented certain new and useful Improvements in Calculating Machines Provided with Two Counters, of which the following is a specification.

Calculating machines are already known provided with two counters, in which transmission is effected to the two counters at the same time from a common setting and operating mechanism, or in which the said mechanism only actuates one of the counters, and then by clearing or restoring the said counter to zero a second counter is caused to take up the amount or setting removed from the first counter, the object being in both cases to form products in the first counter and to obtain their sum in the second counter.

The present invention also refers to calculating machines of the foregoing type in which by restoring a first counter to zero transmission is effected to a second counter.

The object of the invention is to simplify the means by which the transmission is effected and to apply such means in conjunction with transfer mechanism or mechanism for carrying over the tens, so that the usual counter provided with peg machines can be employed without alteration.

In order that the invention may be clearly understood, it will now be described with reference to the accompanying drawings which illustrate, by way of example, one constructional embodiment of a calculating machine made according to its principles.

Fig. 3 shows the commencement of transmission of the value cleared from the first counter to the second or totalizing counter.

Fig. 4 shows the operating mechanism in the rest position.

Fig. 5 shows the same mechanism at the extreme end of the working stroke.

Fig. 6 is a plan of the machine with the first counter removed.

Fig. 7 is a section of a transfer pin.

Figure 1:
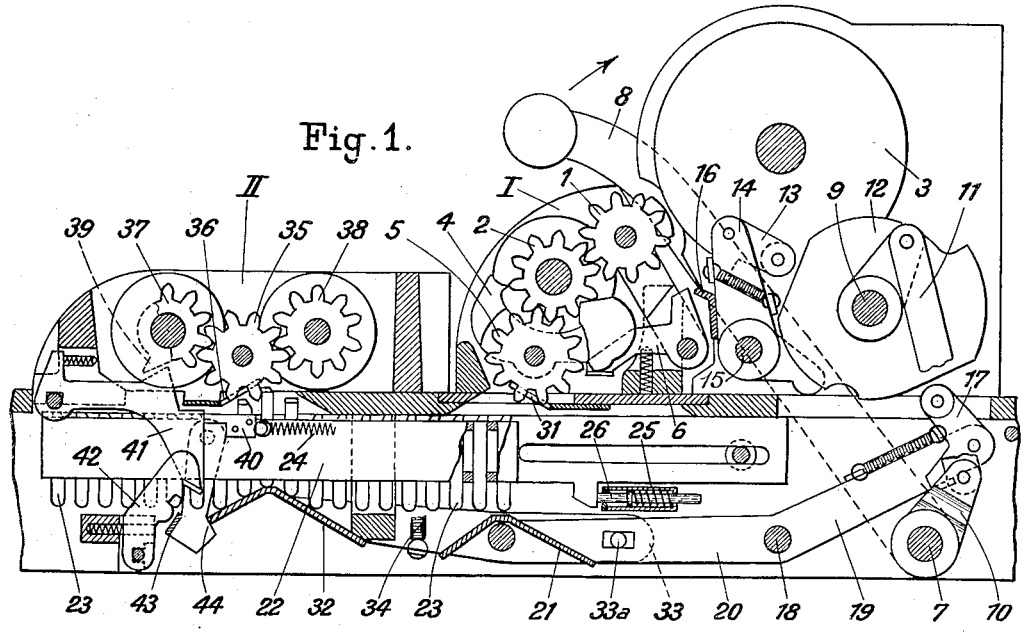
Fig. 1 is a side view of the machine showing the operating mechanism, both the counters and the actuating and transmission devices, the machine being shown in section with the parts in the rest or out of use position.

The toothed wheels 1 and 2, belonging to the first counter I, are operated in the ordinary way from the wheel 3. They are secured against inertia or overrunning by the catch 4. The wheel 5 meshes with the wheel 2, the said wheel 5 being connected to the counter. This is carried on the same axle as the catch 4, so that no alterations have to be made in the ordinary counter slides.

As the toothed wheels 2 and 5 and the catch 4 are in the same plane, the catch is cut away to accommodate the wheel 5. The necessary spring pressure is transmitted to the catch, not, in the usual manner, by the direct operation of the spring, but through an intermediate member consisting of a bell crank or bent lever 6, which is under the tension of a compression spring and has a turned out portion engaging the catch 4, as shown at Figs. 1 and 3.

Figure 2:
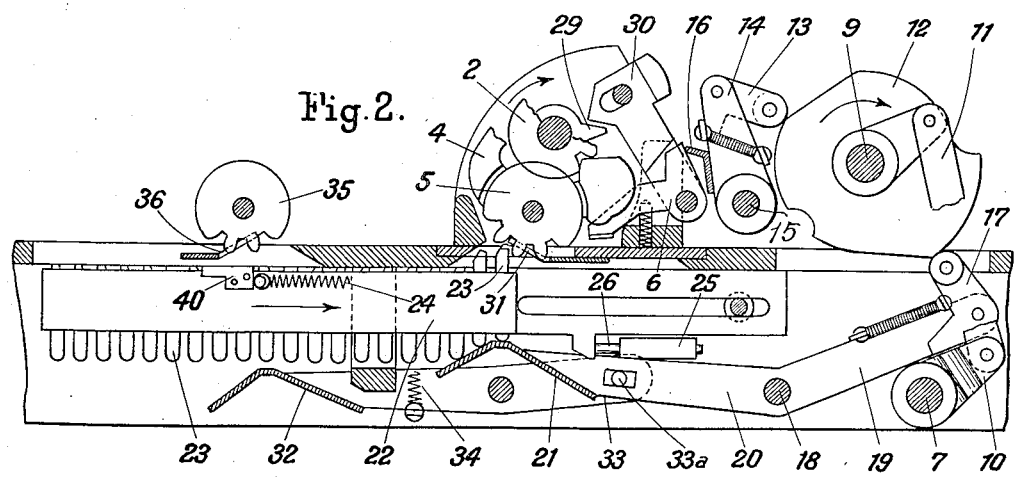
Fig. 2 shows the transmission device in engagement for restoring the first counter to zero.

After the product has been formed, in the usual manner, in the counter I, the handle 8 carried on the axle 7 is moved in the direction of the arrow, and owing to this, amongst other things, the axle 9 is turned in the direction of the arrow Fig. 2, through the lever arm 10 and the link 11.

Keyed to the axle 9 is an operating disc 12, which, when rotated, in the first place pushes a lever 14 towards the left, through the tension of the spring controlled follower 13. The lever is fixed to an axle 15 and carries at the lower part a plate 16 bent at a somewhat obtuse angle. This plate is adapted when the lever 14 is rocked over to come against the member 6 and push it against the stress of its spring, so the catch 4 is thrown entirely out of action, the result being that the wheels 1, 2 and 5 are free to move without obstruction. This position of the parts is illustrated at Fig. 2, and they are kept in this position during the forward movement of the handle 8 by the shaping of the contour of the operating disc 12 corresponding with this phase of the operation.

During the time that the catch 4 has been thrown up, the aforesaid operating disc 12 has been co-operating, by means of another portion of its curved periphery, with another follower 17 which is connected to an arm 19 pivoted on an axle 18. The arm 19 constitutes with the arm 20 a two armed lever. On the opposite side of the machine to the arm 20 is an arm 20ª, see Fig. 6. These two arms carry a metal plate or sheet 21 which is bent like a roof and extends across the machine constituting a sliding device in connection with the arms. It rises and comes into the position shown in Fig. 2 when the handle 8 is operated.

For each numerical place of the counter, a bar 22 is provided adapted to slide at right angles to the various axles. The bars 22 carry a number of operating pegs 23, which are similar to the pegs of the wheel 3. They are adapted easily to slide up and down and are bent over and bevelled at their upper end.

When the roof like plate 21 moves upwards, that is at the commencement of the operation of the handle 8, the pegs 23 which function like the teeth of a toothed rack come into engagement with the gear wheel 5 as indicated at Fig. 2. The bars 22 have a tendency to slide under the pull of springs 24, but they are prevented from sliding, as a general rule, by the bail 25 extending transversely across the whole machine. This bail carries spring bolts 26 against which engage extensions on the bar 22. The bail 25 is connected at the ends to connecting links 27, 27ª (Figs. 5 and 6) pivoted to the cranks 28 and 28ª in such a way that on turning the axle 7 the bail has an oscillating rectilinear movement allowing the bars 22 to move towards the right with concurrent rotation of the wheels 5, 2 and 1 of the counter I, during which period, as previously stated, the catch 4 has no retaining action.

Each counter wheel connected to the toothed wheel 2 is of course provided with the necessary projecting finger 29 for the transfer or for carrying over ten, such finger co-operating with the transfer lever 30. During its travel towards the right, a bar 22 turns through the pegs 23 the figure drum in connection with the toothed wheel 2 back to "0", in the direction of the arrow, out of the position shown in Fig. 2, in which the figure drum is at "9" into the position shown at Fig. 3, in which the finger 29 comes upon the lever 30. The lever does not move out of the way if the operating mechanism is in the normal position, the handle 8 being operable only when the parts are in such position.

During the movement towards the right the transmission bars 22 will have moved to a greater or less extent according to the values shown on the drums of the counter I and will have cleared the said counter or returned it to zero. During this time the pegs 23 have been sliding over the roof like member 21 by which they have been moved upwards. In order to bring the pegs 23 down again, if they should not fall by their own weight, a frame 31 is provided with an inclined surface against which the tops of the pegs engage and by which they are pushed down into the inoperative position.

When the handle 8 has completed its stroke in the direction of the arrow, it returns, preferably under the tension of a spring, whereupon the followers 13 and 17 rock over owing to the fact that they come opposite the recesses in the operating disc 12, Fig. 3. The bent levers 6 again exert their pressure on the catches 4, and at the same time the roof like member 21 sinks down and another similarly shaped member 32 rises. The members 21 and 32 are so interconnected, by means of a pin 33ª in the arm 33 which engages in a slot in the arm 20ª, that, when one of the members rises the other falls, and conversely, such movements being occasioned in the one case by the follower mechanism 17 and in the other case by the spring 34.

After the parts have come into the position shown at Fig. 3, at the commencement of the return movement of the handle, the bail 25 also begins to return, moving towards the left and collecting the bars 22 which have been more or less displaced, whereupon the pegs 23 now ride over the roof member 32 and operate the toothed wheel 35. As they travel towards the left the pegs are pushed downwards by means of the incline 36.

In engagement with the toothed wheels 35 are the figure drums 37, 38 which are provided with oppositely directed figures. The figure drums 37 indicate, at the end of the return stroke of the handle Fig. 1, the value taken up from the counter I, whilst the figure drums 38 show a complementary value the meaning of which will be explained hereafter.

After the bars 22 have entirely returned, the projections 40 thereon come against the lever 41, whereupon the spring bolts 26 engage the bail 25, Fig. 1. If however a figure drum 37 is moved beyond "9", the finger 39 pushes down the lever 41, and a bar 22 in the next higher numerical place moves under the tension of the spring bolt 26 through one place or division, thus producing a transfer or carrying over of ten. The hooks 42 hold the levers 41 in the unlocked position until a strip 43 on a pivoted swinging member swings against it when the member 32 slides down an incline 44 on the other side of the swinging member, thus returning the transfer mechanism to its normal position.

Although transmission from the counter I to the counter II only takes place in the positive direction or direction for addition, it is possible to effect negative calculations by providing in combination with the figure wheels or drums 37, the drums 38 having complementary numbers.

The following illustrative example may be given. From the total 175.25 subtract a discount of 5.5%. What is the amount of the capital after deducting the discount, and what is the amount of the discount?

The amount 175.25 is set in the ordinary way through the operating mechanism. The counter is moved three places to the right (on account of the per cent, and the decimal place in the multiplier 5.5). A single subtraction operation is made. The counter is brought to its normal position and the lever 8 is operated. The counter I is thus cleared or returned to zero. In the counter II the complementary value of the capital appears on the drums 37:—99824.75000.

The setting mechanism remains unaltered. Multiplication is effected by 5.5. On the counter we have:—

$$175.25 \times 5.5 = 9.63875.$$

This is equal to the discount. Transmission is now effected to the totalizing counter, whereupon addition of the discount is effected to the complementary value of the capital.

```
  99824.75000
      9.63875
  ───────────
  99834.38875
```

In the negative counter 38 is the capital less the discount, namely the complement of the above, that is to say 165.61125.

In order to effect direct subtraction in the counter II, it is only necessary to operate the drum 38 instead of the drums through the wheels 35 by the teeth 23. This is rendered possible by a displacement of the roof member 32 in such a way that on operating a handle, not shown, the member 32 when subtraction is required comes under the wheels 38. By directly effecting subtraction, the solution of the before mentioned problem would be simplified in an obvious manner.

What I claim and desire to secure by Letters Patent of the United States of America is:—

1. In a calculating machine for multiplication and addition in which adjustment or movement of certain parts or the entry of the numbers to be added or multiplied by is effected by means of gears having adjustable teeth, a construction including transmission means for transmitting values set on the first counter to the second counter, such means consisting of transmission bars provided with teeth with means for throwing the teeth of the bars into and out of action in such a way that when moving in one direction for clearing the first counter the bars are moved through a distance corresponding to the values set, a group of teeth coming into operation for clearing the values, whilst when moving in the opposite direction the bars do not operate the first counter but by means of a second group of teeth operate the second counter so as to transmit positively or negatively the values set on the transmission bars to the second counter together with transfer mechanism for carrying over the tens, for the purposes set forth.

2. Counting machine for addition and multiplication permitting adjustment of the numbers to be transferred in gears with displaceable teeth, and having two laterally adjustable counter mechanisms, a driving crank, a transverse bar, transfer gears and locking anchors, said driving crank (8) being so connected with the transverse bar (16) that upon movement of the driving crank the transverse bar is locked, whereby said transverse bar depresses the locking anchors (4) of the transfer gears for the counter mechanism in holding position, said gears again being released upon return of the driving crank.

3. A calculating machine as claimed in claim 1 including for each numerical place a gear wheel in the counter adapted to be operated from the rack members and a locking catch for locking the counter drums except when the value is being cleared or zeroized from the counter, the said locking catch being mounted on the same axle as the said gear wheel and so formed that its ends come in the plane of the gear wheel and the wheels gearing therewith.

4. In a calculating machine as claimed in claim 1, a construction in which each of the transmission bars is formed as a longitudinally slidable bar provided with a plurality of pegs adapted to slide therethrough, such pegs being adapted to be brought into positions for engaging the corresponding required gear wheels of the first and second counters with means such as roof shaped devices co-operating with the said pegs for bringing them into the required position for operation, and means for restoring the pegs to the inoperative positions, substantially as described.

In witness whereof I affix my signature.

MAX MÜLLER.